United States Patent [19]
Sanabria

[11] Patent Number: 5,119,559
[45] Date of Patent: Jun. 9, 1992

[54] COCONUT OPENER WITH SKIN AND SHELL EXTRACTOR

[76] Inventor: Victor M. Sanabria, 235 S.W. Le Jeune Rd., Miami, Fla. 33134

[21] Appl. No.: 738,385

[22] Filed: Jul. 31, 1991

[51] Int. Cl.[5] ............................................. A47J 25/00
[52] U.S. Cl. .................................... 30/120.1; 30/315
[58] Field of Search ................. 30/113.1, 113.3, 120.1, 30/120.2, 315, 316, 355, 357, 346

[56] References Cited

U.S. PATENT DOCUMENTS 1,277,308  8/1918  Gunturiz.
2,472,354  6/1949  Waters.
4,090,296  5/1978  Di Piero ............................ 30/113.1

FOREIGN PATENT DOCUMENTS 521069  3/1931  Fed. Rep. of Germany ........ 30/315

Primary Examiner—Douglas D. Watts
Attorney, Agent, or Firm—Jesus Sanchelima

[57] ABSTRACT

A coconut opener (10) with an extractor for the section of the skin and shell to be removed. The opener (10) includes a handle assembly (20) wherein a off center handle member (24) is rigidly mounted to a shank that in turn is rigidly mounted to a blade assembly (40). The blade assembly (40) has an arcuate shape and it includes two different edge zones. The first edge zone (42) is designed to puncture through the skin and shell of the coconut and it has a strait angular relationship with the back of the blade. The next zone includes edges (44) and (46) follows a tangent relationship with the back of blade (40) and it ends up with a cross-sectional shape of half of an eliptical path. When the opener is fully inserted, and rotated, a section of the skin and shell is thereby removed.

4 Claims, 3 Drawing Sheets

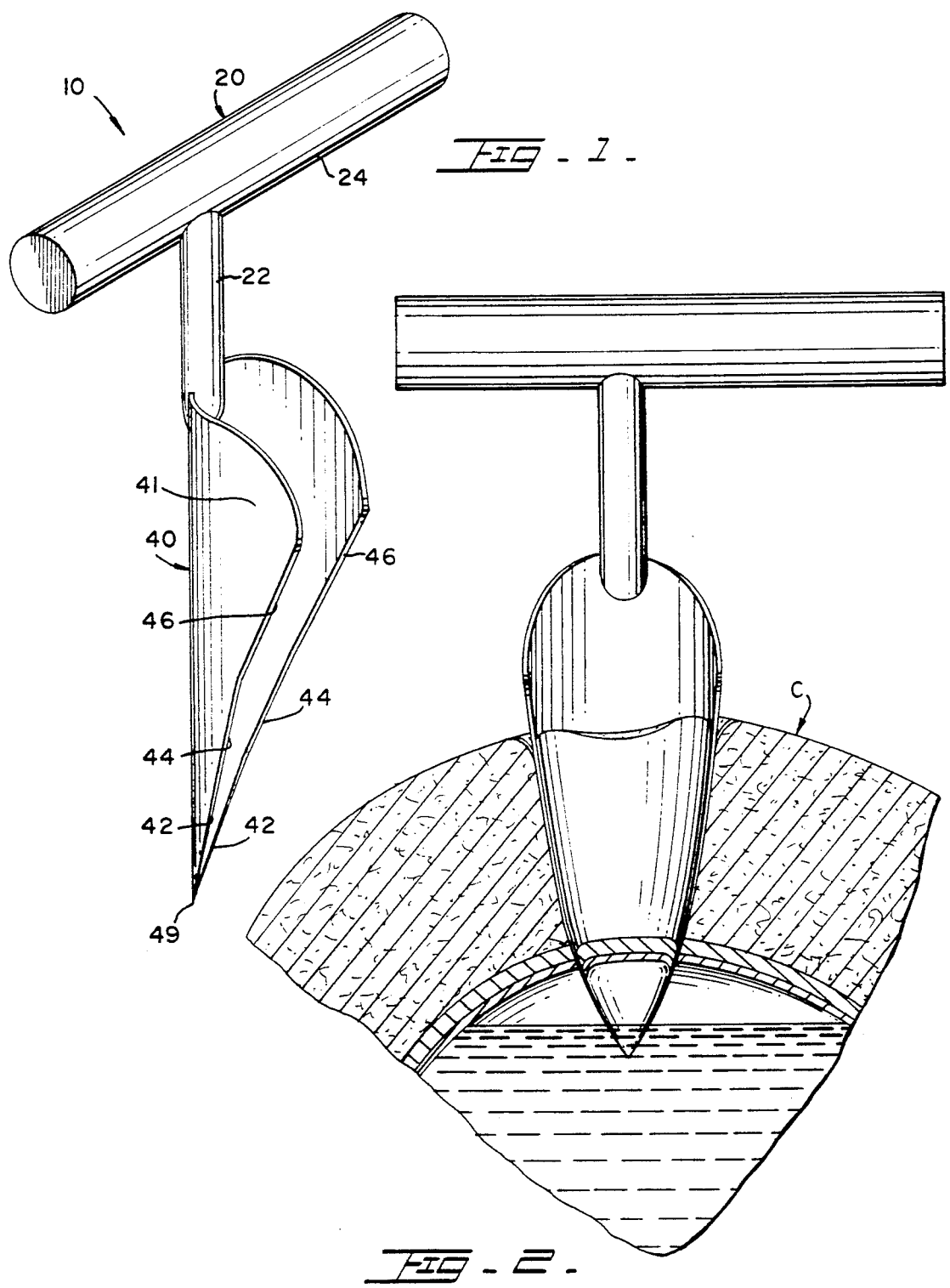

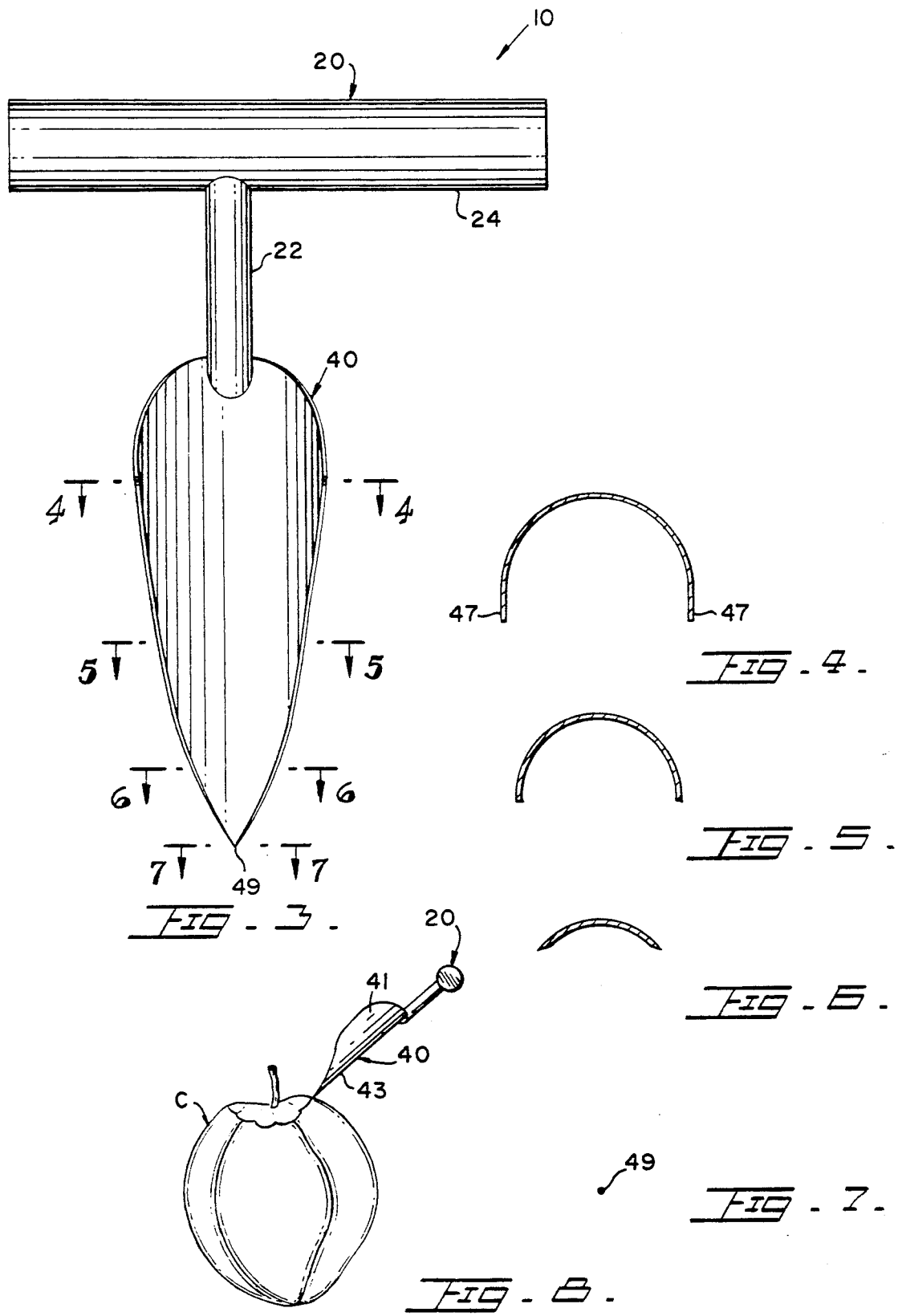

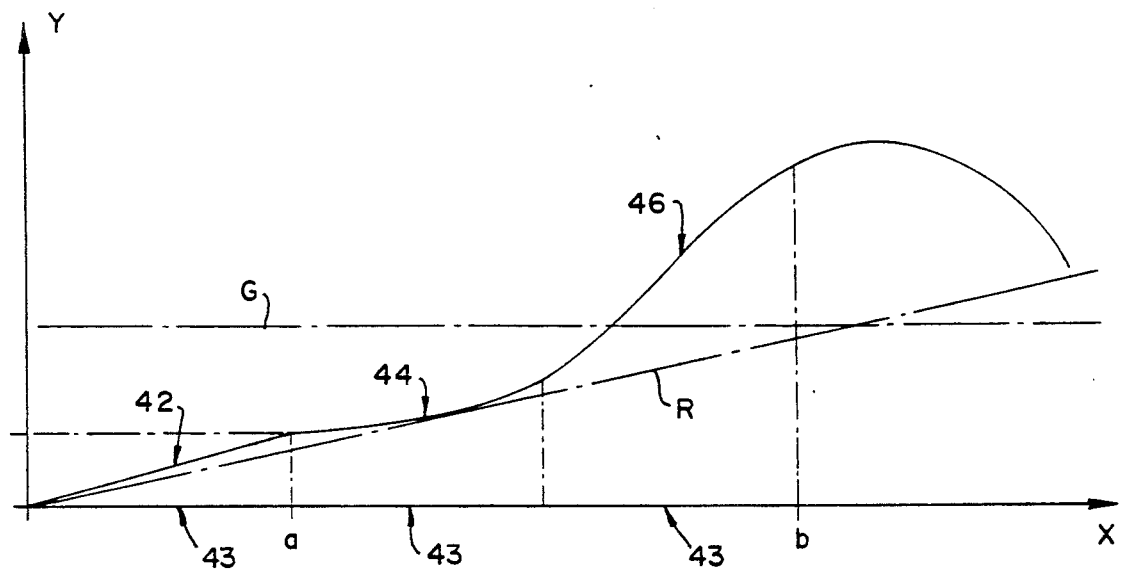
FIG-9-
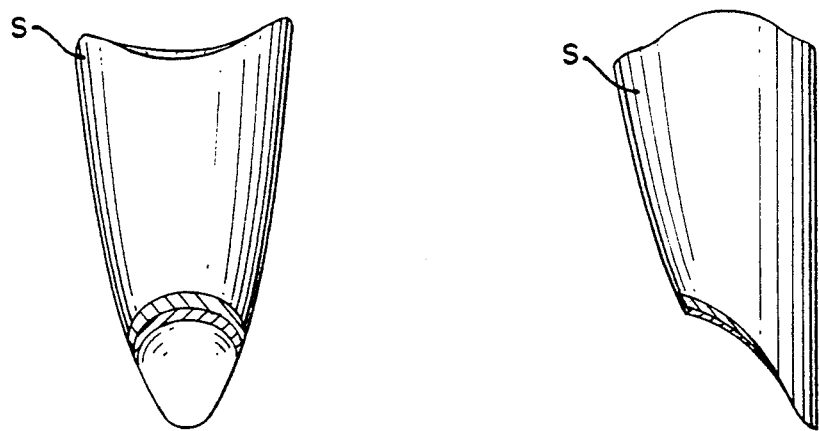
FIG-10-  FIG-11-

COCONUT OPENER WITH SKIN AND SHELL EXTRACTOR

BACKGROUND OF THE INVENTION

1. Field of the Invention

The present invention relates to coconut openers, and more particularly, to such openers that remove a part of the coconut skin and shell thereby permitting the withdrawal of the coconut water inside.

2. Description of the Related Art

A number of instruments have been designed in the past to remove the core of vegetables, such as U.S. Pat. No. 4,090,296 issued to Di Piero in 1978 and coconut punches such as the ones disclosed in U.S. Pat. No. 1,277,308 issued to Gunturiz in 1917 and U.S. Pat. No. 2,472,354 issued to Waters in 1946. However, none of these devices provide for a tool that, when rotated, will readily extract a section of the skin or shell permitting the water inside a coconut to be extracted.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a device that can be readily inserted through the coconut skin and shell, and with relatively small force puncture through the hard shell, rotated thereby cutting and grabbing a section of the skin and shell of the coconut permitting a user to remove same leaving an opening through which the coconut water can be drawn.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents an isometric view of the present invention.

FIG. 2 represents a front elevational view of the present invention with a partial cross-sectional view of the coconut being punctured.

FIG. 3 is a front elevational view of the present invention.

FIG. 4 is a cross-sectional top view of the present invention as seen from line 4—4.

FIG. 5 is a top view of the present invention as seen from line 5—5.

FIG. 6 is a top view of the present invention as seen from line 6—6.

FIG. 7 is a cross-section as seen from line 7—7.

FIG. 8 is a pictorial representation of the present invention as it is being utilized with a coconut to remove its cover and stem.

FIG. 9 represents a side elevational view of the present invention wherein the back line of the blade rests along the X axis of a cartesian coordination system.

FIG. 10 is a pictorial representation of a typical section of the coconut skin and shell extracted with the present invention.

FIG. 11 is another elevational of the section of the coconut shown in the previous figure.

DETAILED DESCRIPTION OF THE PREFERRED EMBODIMENT

Referring now to the drawings, where the present invention is generaly referred to with numeral 10, it can be observed that it basically includes a handle assembly 20 and blade assembly 40.

Handle assembly 20 has a handle member 24 perpendicularly mounted to shank member 22. In the preferred embodiment, handle member 24 is rigidly mounted off center to shank member 22. This will provide a suitable fulcrum and torque to the user.

Blade assembly 40, as it can be seen in FIG. 1, has an arcuate shape with sharp edges that have been identified as edges 42, 44, and 46. Blade assembly 40 ends with pointed end 49. Edge 42 is the lowermost edge and it goes at an angle with respect to back line 43 of blade members 41. This is shown in FIGS. 3 and 6. Blade assembly 40 has substantially a conical projection in an elevational front view as seen in FIG. 2.

Referring now to FIG. 9, it can be seen that the side elevational shape of the edges are defined with opener 10 resting on its backline 43. Edge 42 can be expressed as a linear function if we are to use the cartesian coordinates. Edge 42 corresponds to the first zone which is identified as $Y_1$.

$$Y_1 = K_1 \cdot X$$

In FIG. 9 edges 44 and 46 correspond to the second zone can be defined with a tangent function as $Y_2$.

$$Y_2 = K_2 \operatorname{Tan}(X-a) + c \text{ where } a < X < b$$

Where "$Y_2$" corresponds to the height of the edge in the elevational side view of the second and third zones, defines in FIG. 3 as edges 44 and 46. "X" corresponds to the horizontal distance. "c" is a displacement constant since $Y_2$ starts after point "a" at a height "c". Edge 44, while also being defined as a tangential function of the displacement along the "X" axis, it starts substantially as a linear function as it is characteristic of the tangent functions for low values and reaching "1" for a 45 degrees angle. After that, the "Y" value starts to rise rapidly towards infinity for 90 degrees. Edge 46 represents a value after 45 degrees and less than 90 degrees. It has been found that the transition from a linear projected relationship of the edges of the first zone to the edges of the second zone is smoother when the latter follow a relationship defined as a transport function. In this manner the puncturing an penetration achieved by the sharp pointed end and the edges of the first zone are continued without an abrupt transition.

It can be observed that the cross-sectional view of FIGS. 4; 5 and 6 show the same radius of curvature in order to keep aligned the longitudinal axis over which tool 10 is rotated. In this manner, the extraction of a section of the skin and shell of the coconut C having substantially the shape of a truncated cone is facilitated. It should be noted that the section gripping function is performed by the small straight ends 47 of edge 46, as shown in FIG. 4. Ends 47 have a theoretical infinite radius of curvature by being straight. Straight ends 47 provide the necessary gripping function to extract section S.

The shape of edges 42, 44, and 46 is critical in that the first edge 42 is designed only to puncture through the skin and shell of the coconut C. While edge 44 provides a transitional area and edge 46 finally provides the extension of the ends of blade 40 to grab the section of the skin and core being extracted.

The arcuate shape of blade assembly 40 has the characteristic that the geometric center is such that it follows straight line "G" in FIG. 9 whereas the axis of rotation is illustrated with letter "R" at an angle with respect to line "G". The section produced when device 10 is rotated is a frutroconical section as shown in FIGS. 10 and 11. Device 10 can not rotate around line "G" once pointed end 49 is inserted. Rather the axis of rotation will be straight line R which extends at a constant angular relationship with respect to line "G".

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense.

What is claimed is:

1. A coconut opener for removing a section of the skin and shell of a coconut, comprising:
   A. a handle assembly comprising a handle member and a shank member perpendicular by and rigidly mounted to said handle member; and
   B. a blade assembly having a substantially arcuate shape with opposite and symmetrical sharp edges having substantially a conical projection and a pointed end, and said blade assembly defining a back line longitudinally extending along said blade assembly and colinearly disposed with respect to said shank member and said sharp edges defining a first zone wherein their projection that keep a constant angular relationship with respect to said back line and a second zone of said sharp edges adjacent to and continuing from said first zone with projections that keep a relationship with said back line that is a tangential function of the distance from said pointed end and the end of said second zone farthest away from said pointed end having a extended gripping straight edge.

2. The coconut opener set forth in claim 1 wherein the relationship kept between said back line and the edges of said second zone is expressed by the following mathematical formula:

$$Y_2 = K_2 \text{Tan}(X-a) + c \text{ where } a < X < b$$

so that the edges of said second zone adjacent to said first zone are substantially linear thereby smoothing out the transition from said first zone to said second zone.

3. The coconut opener set forth in claim 2 wherein the radius of curvature of said blade assembly is such that the centers of said zones follows a straight line and the axis of rotation of said opener keeps an constant angular relationship with respect to said straight line defined by the centers of the archuate blade radius of curvature.

4. The coconut set forth in claim 3 wherein said handle member is off-centered with respect to said shank.

* * * * *